United States Patent
Banerjee et al.

(10) Patent No.: US 8,219,498 B2
(45) Date of Patent: Jul. 10, 2012

(54) FORMING DYNAMIC REAL-TIME ACTIVITY GROUPS

(75) Inventors: Nilanjan Banerjee, West Bengal (IN);
Dipanjan Chakraborty, Kolkata (IN);
Koustuv Dasgupta, New Delhi (IN);
Sumit Mittal, Uttar Pradesh (IN);
Seema Nagar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 12/472,621

(22) Filed: May 27, 2009

(65) Prior Publication Data
US 2010/0306119 A1 Dec. 2, 2010

(51) Int. Cl.
G06Q 99/00 (2006.01)
G06Q 10/00 (2012.01)

(52) U.S. Cl. .......................................... 705/319; 705/1.1

(58) Field of Classification Search ........................ None
See application file for complete search history.

(56) References Cited

U.S. PATENT DOCUMENTS

| 7,069,308 | B2 | 6/2006 | Abrams | |
|---|---|---|---|---|
| 2005/0177385 | A1 | 8/2005 | Hull et al. | |
| 2007/0255807 | A1 | 11/2007 | Hayashi et al. | |
| 2008/0098313 | A1* | 4/2008 | Pollack | 715/753 |
| 2008/0132252 | A1* | 6/2008 | Altman et al. | 455/457 |
| 2008/0133495 | A1* | 6/2008 | Fischer | 707/5 |
| 2008/0140650 | A1 | 6/2008 | Stackpole | |
| 2008/0188261 | A1* | 8/2008 | Arnone | 455/550.1 |
| 2008/0235349 | A1 | 9/2008 | Caspi et al. | |
| 2009/0012841 | A1* | 1/2009 | Saft et al. | 705/10 |
| 2009/0157693 | A1* | 6/2009 | Palahnuk | 707/10 |
| 2010/0088246 | A1* | 4/2010 | Lim | 705/319 |
| 2010/0205541 | A1* | 8/2010 | Rapaport et al. | 715/753 |

OTHER PUBLICATIONS

BusinessFinder: http://www.businessfinder.com/index.asp.

* cited by examiner

*Primary Examiner* — Jonathan Ouellette
(74) *Attorney, Agent, or Firm* — Ryan, Mason & Lewis, LLP

(57) ABSTRACT

Techniques for forming a real-time activity group are provided. The techniques include creating a set of one or more users, annotating each user in the set with one or more corresponding real-time attributes, and using the one or more real-time attributes to identify one or more connections between the one or more users in the set to form a real-time activity group within the set of one or more users, wherein the one or more connections are based on an activity request.

20 Claims, 4 Drawing Sheets

FORMING DYNAMIC REAL-TIME ACTIVITY GROUPS

FIELD OF THE INVENTION

Embodiments of the invention generally relate to information technology, and, more particularly, to social networking.

BACKGROUND OF THE INVENTION

Social networking has become a popular medium for online collaboration. Maturing Web 2.0 technologies have influenced competing social networking sites (for example, Orkut, Facebook, etc.) to look at ways to provide innovative features. Also, telecommunications (telecom) technologies have experienced changes such as, for example, content and capabilities owned by the operator are now available for developers to combine. Additionally, social networking now includes the use of mobile devices to enable communications with on-line social networking buddies.

However, traditionally, social networks have worked on relatively static and/or slow-changing information, that is, defined once by a user and changed infrequently. Groups that are defined in a social network in existing approaches are similarly static and pre-defined in terms of membership. Further, ways of communicating with group members are also statically defined (for example, leave a scrap, write on a wall, etc.).

SUMMARY OF THE INVENTION

Principles and embodiments of the invention provide techniques for forming dynamic real-time activity groups. An exemplary method (which may be computer-implemented) for forming a real-time activity group, according to one aspect of the invention, can include steps of creating a set of one or more users, annotating each user in the set with one or more corresponding real-time attributes, and using the one or more real-time attributes to identify one or more connections between the one or more users in the set to form a real-time activity group within the set of one or more users, wherein the one or more connections are based on an activity request.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include enabling real-time social networking using converged telecom infrastructure. One or more embodiments of the invention include forming dynamic groups in real-time and on-demand, wherein the membership of a group is determined by current attributes of the subscribers (for example, what I want to do this Friday evening) so as to exploit real-time interests as opposed to "fixed" interests. Also, the modality of communication between group members is also dynamic and includes a set of communication modes available for a certain period of time. The period of time can be set, for example, instantly or scheduled beforehand (for example, "Call me on my cell phone after 5:00 PM," "catch me on Google Talk before 5:00 PM," etc.).

Further, in one or more embodiments of the invention, the lifetime of the group is also dynamic and depends on the purpose (interest) that influenced its formation in the first place (for example, an upcoming Friday night concert, a weekend trekking activity, etc.). As such, the techniques described herein include formation of real-time activity-oriented dynamic groups that includes formation of communication edges between nodes in a dynamic group based on real-time attributes (such as, for example, location, availability, real-time interests, buddy lists, etc.).

One or more embodiments of the invention include identifying real-time attributes (for example, presence, availability, interest, location, etc.) of people from various social networking communication medium based on a search query provided and/or defined by a user, and forming the dynamic real-time activity group including the user and people having the real-time attributes matching the search query. As such, using the context of any real-time activity as defined by the user, one or more embodiments of the invention enable creation and holistic management of ad hoc group of people interested in this activity.

In one or more embodiments of the invention, the activities can be pulled up from an existing database of popular events and/or the user's calendar, or the activities can be any arbitrary activity that is defined (in terms of a number of real-time attributes). Additionally, the techniques detailed herein include searching for a group of users that might be potentially interested in the activity, forming a group of these users in real-time by exploiting multiple modalities such as, for example, a telephone call, a short message service (SMS), an instant message (IM), a Web component, and enabling real-time communication of these users with each other based on the dynamic communication preference of the users.

Further, one or more embodiments of the invention are based on the notion of user context that considers both presence as well as live interests of people (derived from multiple communication media) in forming the group. Live interests differ from static interests in the sense that they need to be captured from the users through different communication modalities and fed back to the matchmaking system that forms a relevant group of users interested in the activity. Additionally, the techniques described herein provide mechanisms to not only create such real-time activity groups but also maintain and manage these groups through their entire lifecycle. This, in turn, requires different operations to be enabled in terms of adding new members, dropping members, changing the activity details in real-time (for example, to a different time), etc.

In deriving real-time interests, multiple information sources can be used. Such sources can include, for example, a mobile phone of the user (for example, via SMS/IM), third-party messaging clients (for example, Google Talk, etc.), as well as social networking sites like Facebook. Additionally, because the group is real-time/dynamic in nature, communication channels available between the group members also need to be dynamic. For example, at different times of the day a user might choose to be contacted on his/her mobile phone (for example, via call/SMS), while at other times the user might choose to be contacted by an IM client or other Web-based techniques (for example, a post to the user's social networking portal).

One or more embodiments of the invention include a situational mashup application that exploits content and capabilities of a Telecom operator as well as Web 2.0 technologies. For example, IP multimedia subsystem-(IMS)-based converged networks technologies can be leveraged to establish multi-modal communication between participants (for example, a telephone call, a SMS, an instant message, Google Talk, etc.).

By way of example and not limitation, the below illustrates one exemplary implementation of one or more embodiments of the invention. Assume that a subscriber, Neel, has two tickets to a concert in Delhi on Friday night. The concert starts in a few hours and none of his friends are in town. Neel can log on to a portal in connection with one or more embodiments of the invention and issue a query for someone interested in this activity.

To add to the search through the list of subscribers, he specifies "Music" as one of the search keywords. The matchmaking engine returns to Neel a list of users (for example, on Google Maps) who have expressed an interest in this activity (namely 'Music'), located in the vicinity, and have their real-time presence status as available. Neel browses over each match and follow links to their social networking profiles (for example, on Orkut). In particular, he likes the profile of Seema. Using the portal, Neel sends an invite to Seema with the event information. Once Seema accepts his invitation, Neel can then use one of the communication widgets (for example, SMS, Click-to-Call, Google Talk, etc.) on the portal to inform her of further relevant details about the event.

Also, in one or more embodiments of the invention, at a later time, when the concert is over, Seema is requested for a feedback on her experience in using the service and, additionally, on Neel. The feedback can be used by one or more embodiments of the invention to update the rating of Neel as an activity partner.

As detailed herein, the techniques described herein demonstrate benefits of enhancing social networks with real-time information extracted from telecom infrastructure (for example, location) as well as presence information extracted from enterprise networks (for example, Google Talk). One or more embodiments of the invention include exploiting Web 2.0 technologies (for example, AJAX) to mashup real-time data from several information sources (for example, social networks, enterprise networks, and telecom infrastructure) to present a subscriber with the enhanced experience of real-time social networking.

One or more embodiments of the invention also include the ability to publish one's own interests (for example, "Movie at Priya") to a service using, for example, SMS, Google Talk, etc, as well the ability to find like-minded people interested in an activity of interest. One can also refine search results based on current location and presence information, and view results on a mashup portal that displays potential matches (for example, on Google Maps) along with attributes (for example, reputation, current interests, and presence status), all which can be dynamically updated using Web 2.0 technologies.

Additionally, as detailed herein, one or more embodiments of the invention include the ability to link to social networking profiles (for example, Orkut) to find the social networks of potential matches, as well as the ability to invite potential matches and communicate with them (for instance, once they have accepted the invite) using Telecom widgets such as 3rd Party Call Control, available on the portal. Further, one can also rate activity partners, thereby benefiting from collaborative feedback.

Figure 1:
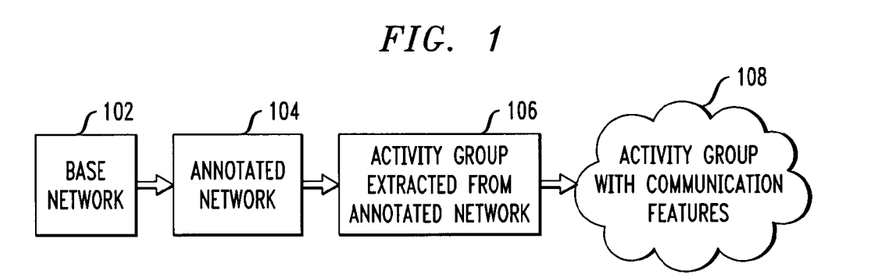
FIG. 1 is a diagram illustrating methodology, according to an embodiment of the present invention.

FIG. 1 is a diagram illustrating methodology, according to an embodiment of the present invention. By way of illustration, FIG. 1 depicts a base network 102, an annotated network 104, an activity group extracted from the annotated network 106, and an activity group with communication features 108. The base network 102 includes subscribers in the mobile operator domain, enterprise domain, buddy lists and/or online social networks. The annotated network 104 includes real-time attributes extracted from telecom, a third party social network and/or an enterprise network.

Also, an activity group extracted from annotated network 106 includes potential group members selected based on multiple attributes (for example, interest in watching a movie on Friday night). An activity group with communication features 108 includes communication capabilities that are defined based on, for example, user preferences (for example, call, SMS, IM, etc.).

Figure 2:
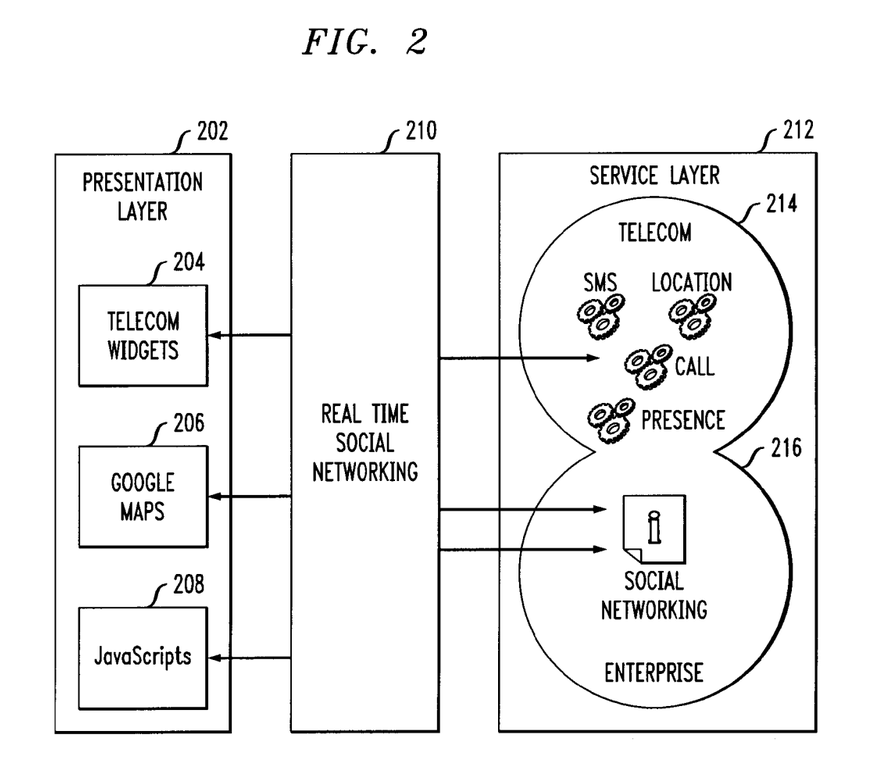
FIG. 2 is a diagram illustrating system architecture, according to an embodiment of the present invention.

FIG. 2 is a diagram illustrating system architecture, according to an embodiment of the present invention. By way of illustration, FIG. 2 depicts a real-time social network 210 that interacts, for example, with a presentation layer 202, which includes telecom widgets 204, Google Maps 206 and JavaScripts 208. A real-time social network 210 also interacts with a service layer 212, which includes a telecom component 214 (which can include attributes such as, for example, location, SMS, call, presence, etc.) and an enterprise component 216 (which can include, for example, a social networking component).

Figure 3:
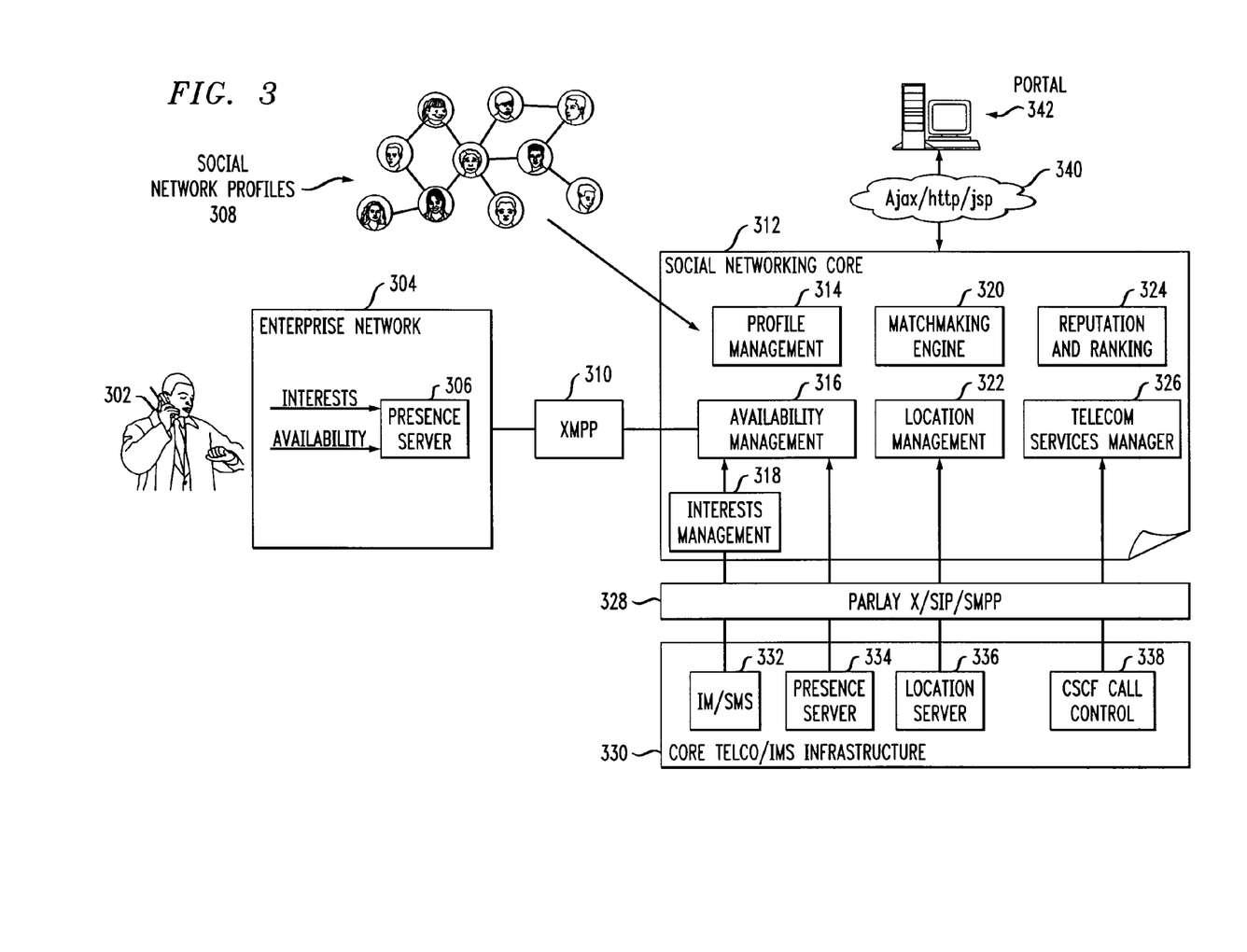
FIG. 3 is a diagram illustrating system architecture, according to an embodiment of the present invention.

FIG. 3 is a diagram illustrating system architecture, according to an embodiment of the present invention. By way of illustration, FIG. 3 depicts a user and/or subscriber 302 who provides input (such as interests, availability, etc.) to an enterprise network 304 that includes a presence server 306. FIG. 3 also depicts social network profiles 308 and extensible messaging and presence protocol (XMPP) 310, which receives input from the enterprise network 304 and transfers the input to the social network core 312, specifically to the availability management component 316. Social networking core 312 also includes a profile management component 314 (which can receive input from social network profiles 308), an interests management component 318, a matchmaking engine 320, a location management component 322, a reputation and ranking component 324 and a telecom services manager component 326.

FIG. 3 also depicts core telco and/or IP multimedia subsystem (IMS) infrastructure 330, which includes an IM/SMS component 332 (which can provide input to the availability management component 316), a presence server 334 (which can also provide input to the availability management component 316), a location server 336 (which can provide input to location management component 322) and a call state control function (CSCF) call control component 338 (which can provide input to telecom services manager component 326). FIG. 3 also depicts a Parlay XMPP/session initiation protocol (SIP)/short message peer-to-peer protocol (SMPP) component 328, which can receive and transfer the input provided by the core telco/IMS infrastructure 330.

Further, FIG. 3 depicts an asynchronous JavaScript plus XML (Ajax)/hypertext transfer protocol (http)/JavaServer pages (jsp) component 340, which interacts with the social networking core 312 and a portal 342.

A profile management component 314 can, for example, manage profile information of different subscribers. For example, information pertaining to individuals can include contact details, interests, social networking page (for example, Orkut, Facebook, etc.) Additionally, a profile database (DB) could be owned by third party provider with application programming interfaces (APIs) to access the information. Further, the profile management component 314 enables profile management of subscribers through multiple channels (for example, Web, SMS, etc.).

A location management component 322 includes efficient tracking of locations of mobile users (via interaction with a location server 336). The availability management component 316 includes user-controlled and automated control of a provider's availability based on contextual attributes and intelligent ranking techniques. The reputation and ranking component 324 includes user feedback driven management of users to develop "social network driven" directory services, and employs subscriber reputation to foster a trust-based social network.

Additionally, the matchmaker engine 320 includes employing efficient search techniques for matchmaking based on a plurality of attributes (for example, interests, location, availability, reputation, etc.). The matchmaking engine 320 also allows user-driven specification, as well as prioritization of search attributes (for example, "Find me someone interested in playing an online game within 2 miles."). Further, the telecom services manager component 326 includes enhancing the user experience by enabling telecom communication widgets for call, SMS, etc.

Figure 4:
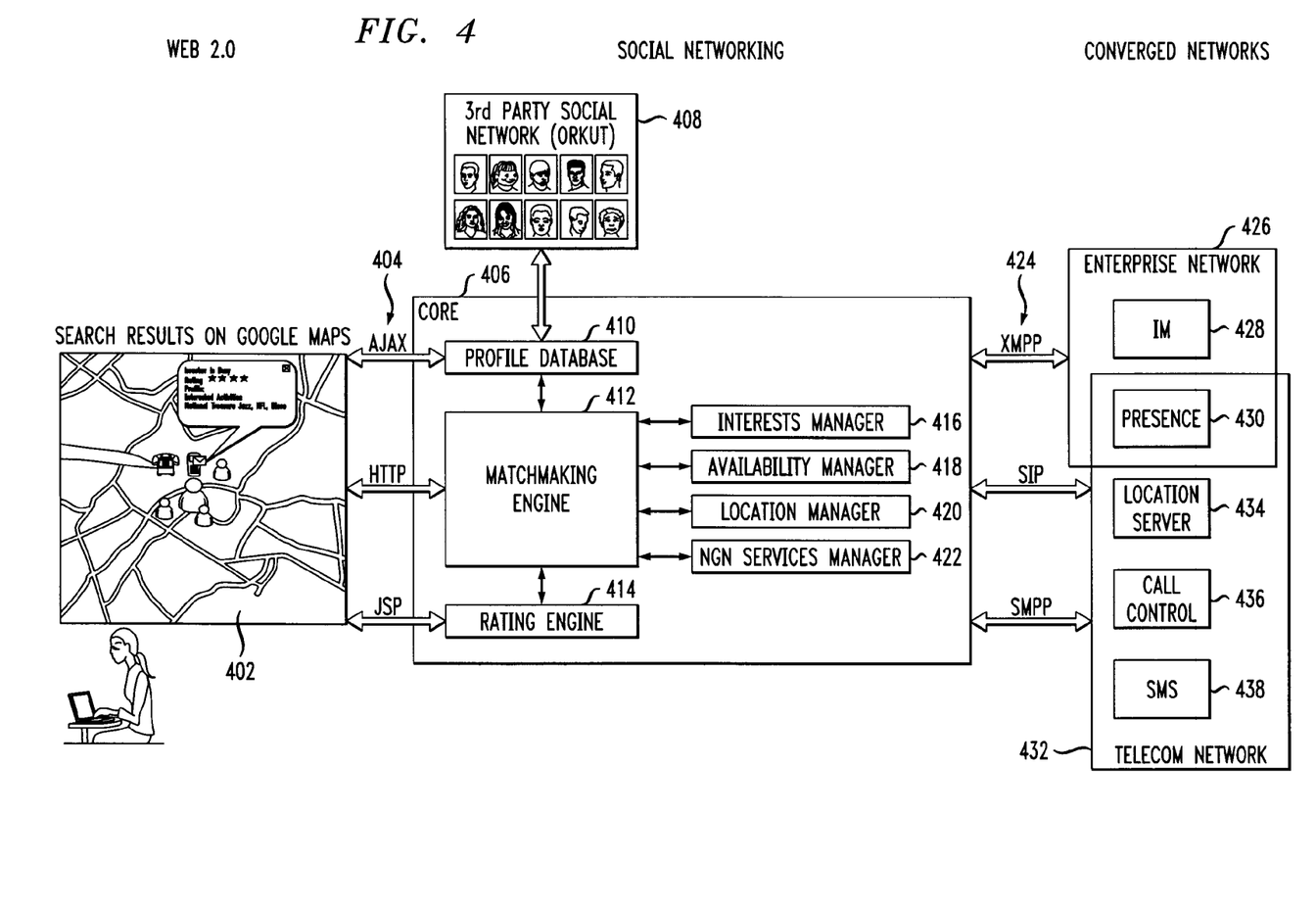
FIG. 4 is a diagram illustrating system architecture, according to an embodiment of the present invention.

FIG. 4 is a diagram illustrating system architecture, according to an embodiment of the present invention. By way of illustration, FIG. 4 depicts a Web 2.0 component/portal 402 (for example, search results on Google Maps) and an Ajax/http/jsp component 404, which interacts with the Web 2.0 component/portal 402 and a social networking core 406. A social networking core 406 can include a profile database 410, a matchmaking engine 412, a rating engine 414, an interests manager 416, an availability manager 418, a location manager 420 and a next generation networking (NGN) services manager 422. Each of the core components interact with the matchmaking engine 412.

FIG. 4 also depicts a third party social network 408 (for example, Orkut) that can interact with the profile database 410. Additionally, FIG. 4 depicts an XMPP/SIP/SMPP component 424, which interacts with the social networking core 406 and the converged networks. The converged networks can include an enterprise network 426, which includes an IM component 428, and a telecom network 432, which includes a presence component 430, a location server 434, a call control component 436 and a SMS component 438.

Figure 5:
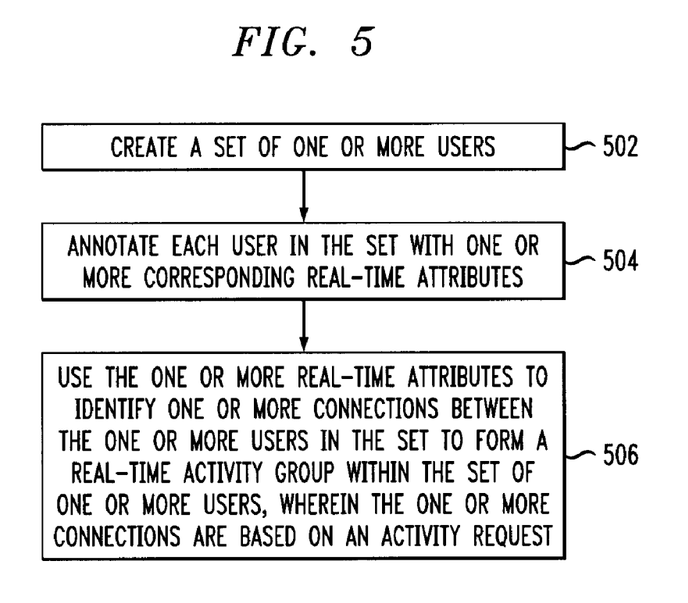
FIG. 5 is a flow diagram illustrating techniques for forming a real-time activity group, according to an embodiment of the invention.

FIG. 5 is a flow diagram illustrating techniques for forming a real-time activity group, according to an embodiment of the present invention. Step 502 includes creating a set of one or more users (for example, from one or more networks (for example, telcos, enterprise networks, social networking sites, etc.)). Creating a set of users can include collecting real-time information about subscribers of one or more networks by applying a membership function (for example, subscription status). Additionally, creating a set of users can include collecting real-time information about subscribers of one or more networks from manually specified sources (for example, buddy lists/friends in a social network/colleagues in a company network).

Step 504 includes annotating each user in the set with one or more corresponding real-time attributes. The corresponding real-time attributes can include location, presence status (for example, busy, available, etc.), interests, hobbies, one or more moods (for example, happy, bored, etc.) and/or a preferred mode of communication. Also, the corresponding real-time attributes can be derived from information sources (for example, a telecom operator, her social or enterprise network, an instant messaging client, etc.).

Step 506 includes using the one or more real-time attributes to identify one or more connections between the one or more users in the set to form a real-time activity group within the set of one or more users, wherein the one or more connections are based on an activity request. Using the real-time attributes to identify connections between the users in the set to form a real-time activity group can include forming a subset of one or more users whose real-time attributes match with a search criteria specified in the activity request.

The techniques depicted in FIG. 5 can also include assigning one or more communication modalities (for example, call/SMS/IM) between the users in the real-time activity group based on real-time preferences of each user. Additionally, one or more embodiments of the invention include sending out an invitation to one or more users to join the activity group (for example, using communication modalities of Telco/enterprise network), forming a group with users that accept the invitation, and scheduling the activity in the individual calendar of each user.

One or more embodiments of the invention also include maintaining relevant information about the real-time activity group (for example, the number of participants, their profile information and communication preferences, etc.) during the entire lifetime of the group. The techniques described herein also include enabling a user to publish an activity request (for example, using SMS or Google Talk), refining search results based on current location and presence information, as well as producing and/or viewing search results on a mashup portal that displays potential matches (for example, on Google Maps) along with attributes (such as reputation, current interests, and presence status, etc., which are all dynamically updated using Web 2.0 technologies).

Further, one or more embodiments of the invention include enabling a user to find a social network of a potential matching user and to link to one or more social networking profiles (for example, Orkut, Facebook, etc.). Also, the techniques depicted in FIG. 5 can include enabling a user to rate one or more activity partners/users (thereby benefiting from collaborative feedback).

The techniques depicted in FIG. 5 can also include, as described herein, providing a system, wherein the system includes distinct software modules, each of the distinct software modules being embodied on a tangible computer-readable recordable storage medium.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 6:
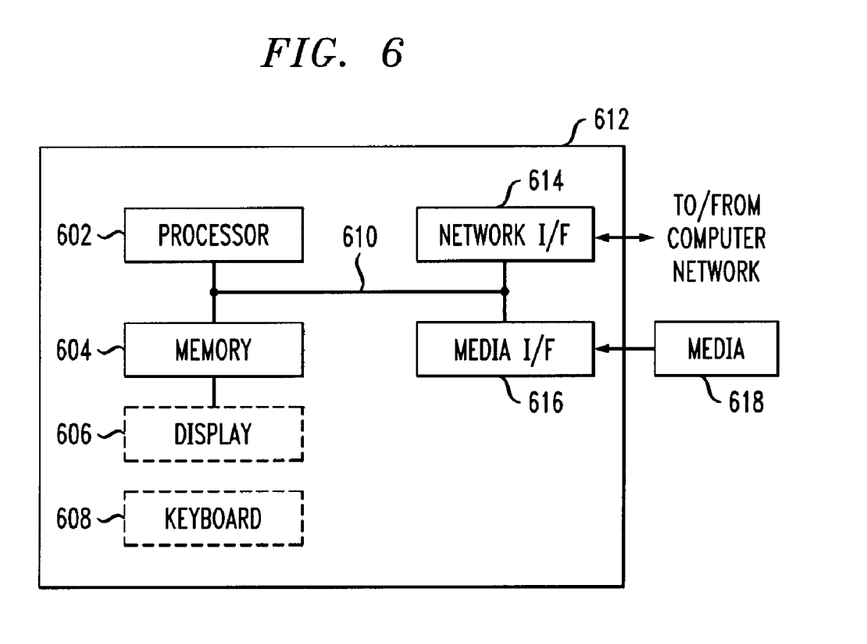
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction implementation system. For the purposes of this description, a computer usable or computer readable medium can be any apparatus for use by or in connection with the instruction implementation system, apparatus, or device. The medium can store program code to implement one or more method steps set forth herein.

The medium can be an electronic, magnetic, optical, electromagnetic, infrared, or semiconductor system (or apparatus or device) or a propagation medium. Examples of a tangible computer-readable storage medium include a semiconductor or solid-state memory (for example memory 604), magnetic tape, a removable computer diskette (for example media 618), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or implementing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may implement entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which implement via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which implement on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium; the modules can include any or all of the components shown in FIG. 3 and/or FIG. 4. The method steps can then be carried out using the distinct software modules and/or sub-modules of the system, as described above, executing on a hardware processor. Further, a computer program product can include a tangible computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, forming a dynamic real-time activity group that includes a user and people having real-time attributes matching a user search query.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for forming a real-time activity group, comprising the steps of:
   creating a set of users from multiple social communication networks, wherein creating a set of users is carried out by a social networking core module executing on a hardware processor;
   annotating each user in the set with one or more corresponding real-time attributes, wherein annotating each user in the set with one or more corresponding real-time attributes is carried out by a social networking core module executing on a hardware processor; and
   using the one or more real-time attributes to identify one or more connections within the set of users to form a real-time activity group within the set of users, wherein the one or more connections are based on an activity request, and wherein using the one or more real-time attributes to identify one or more connections within the set of users to form a real-time activity group within the set of users comprises exploiting multiple communication modalities via a situational mashup application to establish multi-modal communication within the set of users across the multiple social communication networks, and wherein using the one or more real-time attributes to identify one or more connections within the set of users to form a real-time activity group within the set of users is carried out by a core infrastructure module executing on a hardware processor.

2. The method of claim 1, wherein the steps are carried out using telecommunications infrastructure.

3. The method of claim 1, wherein the one or more corresponding real-time attributes are derived from one or more information sources, and wherein the one or more corresponding real-time attributes comprise at least one of location, presence status, one or more interests, one or more hobbies, one or more moods and a preferred mode of communication.

4. The method of claim 1, wherein creating a set of users comprises collecting real-time information about one or more subscribers of one or more networks by applying a membership function.

5. The method of claim 1, wherein creating a set of users comprises collecting real-time information about one or more subscribers of one or more networks from one or more manually specified sources.

6. The method of claim 1, wherein using the one or more real-time attributes to identify one or more connections between the set of users to form a real-time activity group within the set of users comprises forming a subset of users whose one or more real-time attributes match with a search criteria specified in the activity request.

7. The method of claim 1, further comprising assigning one or more communication modalities between the users in the real-time activity group based on one or more real-time preferences of each user.

8. The method of claim 1, further comprising:
sending out an invitation to one or more users to join the activity group; and
forming a group with one or more users that accept the invitation and scheduling the activity in an individual calendar of each user.

9. The method of claim 1, further comprising maintaining relevant information about the real-time activity group during an entire lifetime of the group.

10. The method of claim 1, further comprising enabling a user to publish an activity request.

11. The method of claim 1, further comprising refining search results based on current location and presence information.

12. The method of claim 1, further comprising producing search results on a mashup portal that displays one or more potential matches along with one or more attributes.

13. The method of claim 1, further comprising enabling a user to find a social network of a potential matching user and to link to one or more social networking profiles.

14. The method of claim 1, further comprising enabling a user to rate one or more activity partners.

15. A computer program product comprising a tangible computer readable recordable storage medium including computer useable program code to cause a computer to complete the following steps:
creating a set of users from multiple social communication networks;
annotating each user in the set with one or more corresponding real-time attributes; and
using the one or more real-time attributes to identify one or more connections within the set of users to form a real-time activity group within the set of users, wherein the one or more connections are based on an activity request, and wherein using the one or more real-time attributes to identify one or more connections within the set of users to form a real-time activity group within the set of users comprises exploiting multiple communication modalities via a situational mashup application to establish multi-modal communication within the set of users across the multiple social communication networks.

16. The computer program product of claim 15, wherein using the one or more real-time attributes to identify one or more connections between the set of users to form a real-time activity group within the set of users comprises forming a subset of users whose one or more real-time attributes match with a search criteria specified in the activity request.

17. The computer program product of claim 15, wherein the computer useable program code further causes a computer to complete the following step:
enabling a user to rate one or more activity partners.

18. A system for forming a real-time activity group, comprising:
a memory; and
at least one processor coupled to the memory and operative to:
create a set of users from multiple social communication networks;
annotate each user in the set with one or more corresponding real-time attributes; and
use the one or more real-time attributes to identify one or more connections within the set of users to form a real-time activity group within the set of users, wherein the one or more connections are based on an activity request, and wherein using the one or more real-time attributes to identify one or more connections within the set of users to form a real-time activity group within the set of users comprises exploiting multiple communication modalities via a situational mashup application to establish multi-modal communication within the set of users across the multiple social communication networks.

19. The system of claim 18, wherein the at least one processor coupled to the memory operative to use the one or more real-time attributes to identify one or more connections between the set of users to form a real-time activity group within the set of users is further operative to form a subset of users whose one or more real-time attributes match with a search criteria specified in the activity request.

20. The system of claim 18, wherein the at least on processor coupled to the memory is further operative to:
enable a user to rate one or more activity partners.

* * * * *